E. MAREK.
COUPLING.
APPLICATION FILED DEC. 8, 1909.
957,695.
Patented May 10, 1910.
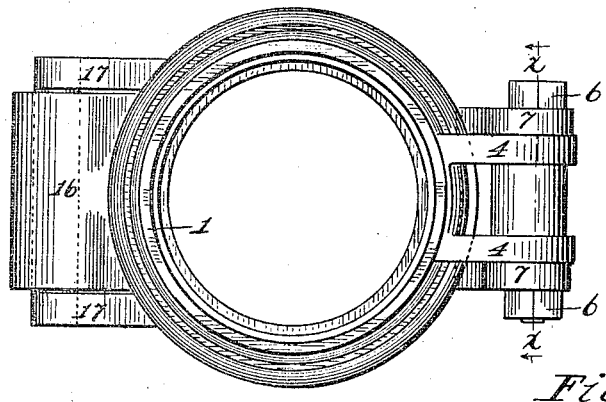
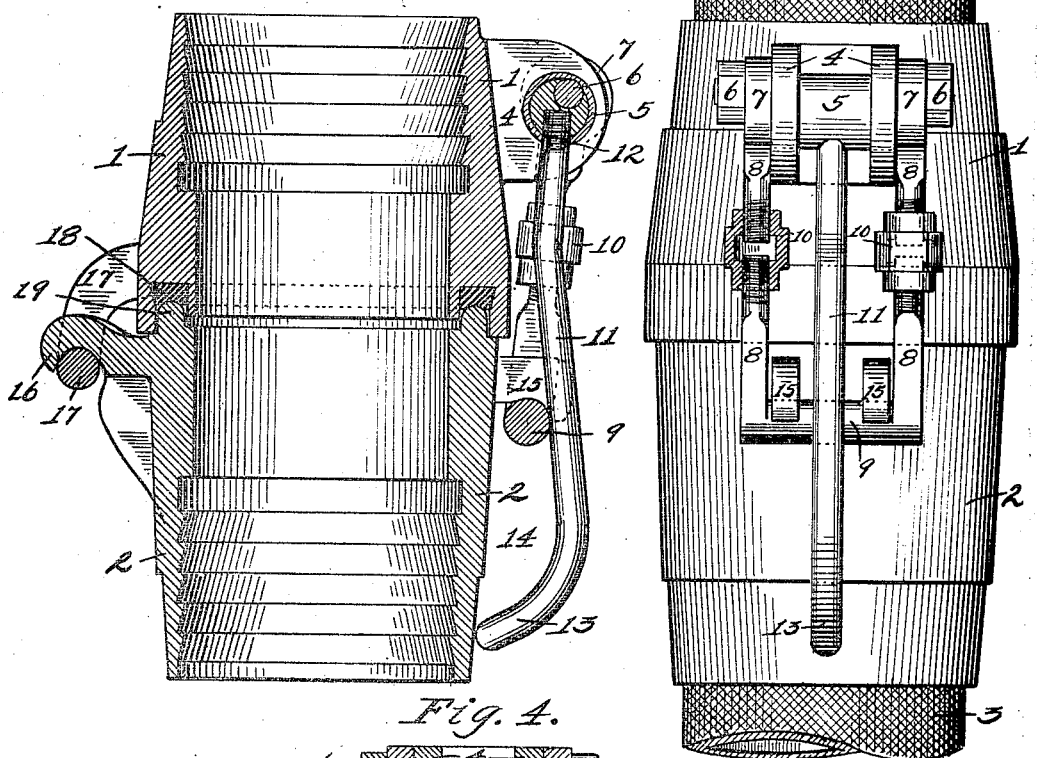
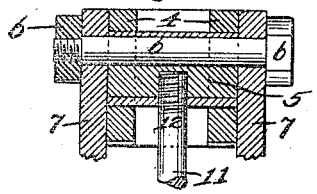
Witnesses:
C. E. Wessels
B. G. Richards
Inventor:
Ernest Marek,
By Joshua R. H. Potts
his Attorney.

UNITED STATES PATENT OFFICE.

ERNEST MAREK, OF CHICAGO, ILLINOIS.

COUPLING.

957,695.  Specification of Letters Patent.  Patented May 10, 1910.

Application filed December 8, 1909. Serial No. 531,969.

*To all whom it may concern:*

Be it known that I, ERNEST MAREK, a citizen of the United States, residing at Chicago, county of Cook, and State of Illinois, have invented certain new and useful Improvements in Couplings, of which the following is a specification.

My invention relates to improvements in couplings for clamping together sections of hose, pipe, etc., and has for its object the production of such means which shall be of improved construction and operation.

The invention consists in the combination and arrangement of parts hereinafter described and claimed.

The invention will be best understood by reference to the accompanying drawings forming a part of this specification, and in which, Figure 1 is a longitudinal section through a coupling embodying my invention, Fig. 2, an elevation of the same showing sections of hose coupled thereby, Fig. 3, a top plan view of Fig. 1, and Fig. 4 a section on line $x$—$x$ of Fig. 3.

The preferred form of construction as illustrated in the drawings comprises two abutting tubular members 1 and 2 adapted to be secured to the ends of hose sections 3. Tubular member 1 is provided at one side with integral adjacent lugs 4 in which a cylindrical rotary member 5 is pivoted. A bolt 6 is passed through member 5 eccentrically and eyes 7 on the ends of limbs 8 of the U-shaped link are secured to said bolt, as shown. Limbs 8 are connected by yoke 9 and are provided with turn-buckles 10 by means of which their lengths may be adjusted. A clamping lever 11 is removably secured to rotary member 5 preferably by a threaded upper end 12 taking into a threaded socket therein between lugs 4. Lever 11 is provided with the inturned end 13 adapted to contact with the side of tubular member 2 and leave a space 14 for the insertion of the operator's fingers to assist in unlocking said lever. Member 2 is provided with integral adjacent hook projections 15 adapted to engage the yoke 9 of the U-shaped link, as shown. The clamping lever 11 is so secured in member 5 with relation to bolt 6 that when its lower end 13 contacts with member 2 the line connecting the center of bolt 6 with yoke 9 passes outside the axis of member 5, in which position the parts are automatically locked against separation.

Opposite to lugs 4 and projections 15 members 2 and 1 are provided respectively with an integral hook 16 and an integral loop 17 adapted to detachably engage said hook. The abutting end of tubular member 1 is provided with an integrally flaring recess adapted to contain a rubber gasket 18 and the end of member 2 is provided with an annular projecting rib 19 adapted to enter said recess and compress said rubber gasket therein. By this construction it will be seen that the tubular members may be readily placed together and forcibly clamped in position, the gasket 18 being compressed to form a tight joint. By making the recess containing the gasket 18 flaring inwardly danger of accidental displacement of said gasket is obviated.

If desired, instead of the hook and loop junction between one side of members 1 and 2 the clamping lever and link connection may be duplicated on that side.

While I have illustrated and described the preferred construction for carrying my invention into effect this is capable of variation and modification without departing from the spirit of my invention. I, therefore, do not wish to be limited to the exact details of construction set forth, but desire to avail myself of such variations and modifications as come within the scope of the appended claims.

Having described my invention what I claim as new and desire to secure by Letters Patent is:

1. In a coupling, the combination of two tubular members; a rotary member pivoted to one of said tubular members; a wrist pin carried eccentrically by said rotary member; a link pivotally mounted on said wrist pin, the said link being provided with a turn-buckle for adjusting its length; a clamping lever secured to said rotary member; means on the other tubular member adapted to detachably engage said link; and a detachable connection between said tubular members independent of said link, substantially as described.

2. In a coupling, the combination of two tubular members; adjacent lugs on one of said members, a rotary member pivoted in said lugs, a bolt passing through said rotary member eccentrically; a U-shaped link having the ends of its limbs pivotally secured to the ends of said bolt; and the said limbs being provided with turn-buckles for adjusting their lengths; a clamping lever secured to said rotary member between said lugs; hook projections on the other tubular member adapted to engage said link; and a hook and loop connection between said tubular members opposite said lugs and projections, substantially as described.

In testimony whereof I have signed my name to this specification in the presence of two subscribing witnesses.

ERNEST MAREK.

Witnesses:
 HELEN F. LILLIS,
 JOSHUA R. H. POTTS.